US012014397B2

United States Patent
Sorensen et al.

(10) Patent No.: US 12,014,397 B2
(45) Date of Patent: Jun. 18, 2024

(54) IN-STORE COMPUTERIZED PRODUCT PROMOTION SYSTEM WITH PRODUCT PREDICTION MODEL THAT OUTPUTS A TARGET PRODUCT MESSAGE BASED ON PRODUCTS SELECTED IN A CURRENT SHOPPING SESSION

(71) Applicant: Shopper Scientist LLC, Corbett, OR (US)

(72) Inventors: Herb Sorensen, Corbett, OR (US); Mark Heckman, Bradenton, FL (US)

(73) Assignee: SHOPPER SCIENTIST LLC, Corbett, OR (US)

( * ) Notice: Subject to any disclaimer, the term of this patent is extended or adjusted under 35 U.S.C. 154(b) by 332 days.

(21) Appl. No.: 17/404,743

(22) Filed: Aug. 17, 2021

(65) Prior Publication Data

US 2023/0056742 A1 Feb. 23, 2023

(51) Int. Cl.
*G06Q 30/0251* (2023.01)
*G06Q 30/02* (2023.01)
*G06Q 30/0601* (2023.01)
*G06V 40/16* (2022.01)

(52) U.S. Cl.
CPC ..... *G06Q 30/0255* (2013.01); *G06Q 30/0281* (2013.01); *G06Q 30/0639* (2013.01); *G06V 40/172* (2022.01)

(58) Field of Classification Search
CPC .............. G06Q 30/0255; G06Q 30/0281
See application file for complete search history.

(56) References Cited

U.S. PATENT DOCUMENTS

| 10,963,893 B1 * | 3/2021 | Sharma ................. G06F 18/256 |
| 2011/0145093 A1 * | 6/2011 | Paradise ................ G06Q 30/02 |
| | | 705/26.1 |

(Continued)

FOREIGN PATENT DOCUMENTS

WO WO-2020150790 A1 * 7/2020 ......... G06Q 30/0241

OTHER PUBLICATIONS

Bridg Adds Infutor Consumer Identity Data to its Enterprise Brick-and-Mortar-Focused CDP: Digital Identity Resolution Data Will Enhance the Bridg Platform in Helping Brands Identify, Understand and Engage Unknown In-store Customers PR Newswire [New York] Dec. 8, 2020. (Year: 2020).*

(Continued)

*Primary Examiner* — Michael Misiaszek
(74) *Attorney, Agent, or Firm* — Alleman Hall & Tuttle LLP

(57) ABSTRACT

A computerized product promotion system for use in a store is provided. The system comprises one or more processors configured to receive a plurality of captured images of a shopper in a current shopping session in the store and process the plurality of captured images to determine one or more products selected by the shopper during the current shopping session. The one or more processors are further configured to determine an identity of at least one target product, selected by a product prediction model, that is estimated to have a threshold minimum likelihood of being purchased by the shopper during a remainder of the current shopping session. The product prediction model receives as input the one or more products selected by the shopper during the current shopping session, and outputs the identity of the at least one target product.

18 Claims, 12 Drawing Sheets

(56) References Cited

U.S. PATENT DOCUMENTS

| | | | | |
|---|---|---|---|---|
| 2014/0279294 | A1* | 9/2014 | Field-Darragh | G06Q 30/0282 |
| | | | | 705/28 |
| 2015/0120462 | A1* | 4/2015 | Zhang | G06Q 20/386 |
| | | | | 705/14.64 |
| 2020/0258006 | A1* | 8/2020 | Chen | G06Q 30/0267 |
| 2020/0273013 | A1* | 8/2020 | Garner | G06Q 20/3223 |
| 2020/0302510 | A1* | 9/2020 | Chachek | G06Q 30/0639 |
| 2021/0233103 | A1* | 7/2021 | Suetsugi | G06Q 30/0631 |
| 2021/0304291 | A1* | 9/2021 | Aggarwal | G06V 10/25 |
| 2022/0405774 | A1* | 12/2022 | Paolella | G06Q 30/0201 |

OTHER PUBLICATIONS

Using Machine Learning to Predict the Next Purchase Date for an Individual Retail Customer Droomer, M; Bekker, J. South African Journal of Industrial Engineering, suppl. Special Edition31.3: 69-82. South African Institute for Industrial Engineering. (Nov. 2020) (Year: 2020).*

In-store customer behaviour in the fashion sector: Some emerging methodological and theoretical directions Newman, Andrew J; Foxall, Gordon R. International Journal of Retail & Distribution Management31.11/12: 591-600. Emerald Group Publishing Limited. (2003) (Year: 2003).*

How stores are spying on you. Abilene Reporter—News [Abilene] Apr. 21, 2013: C.1. (Year: 2013).*

AI potential boost for battered retail sector: Soon your local supermarket could monitor your body language, via in-store cameras, in a bid to boost sales. The Star [Johannesburg] Jul. 4, 2019: 20. (Year: 2019).*

* cited by examiner

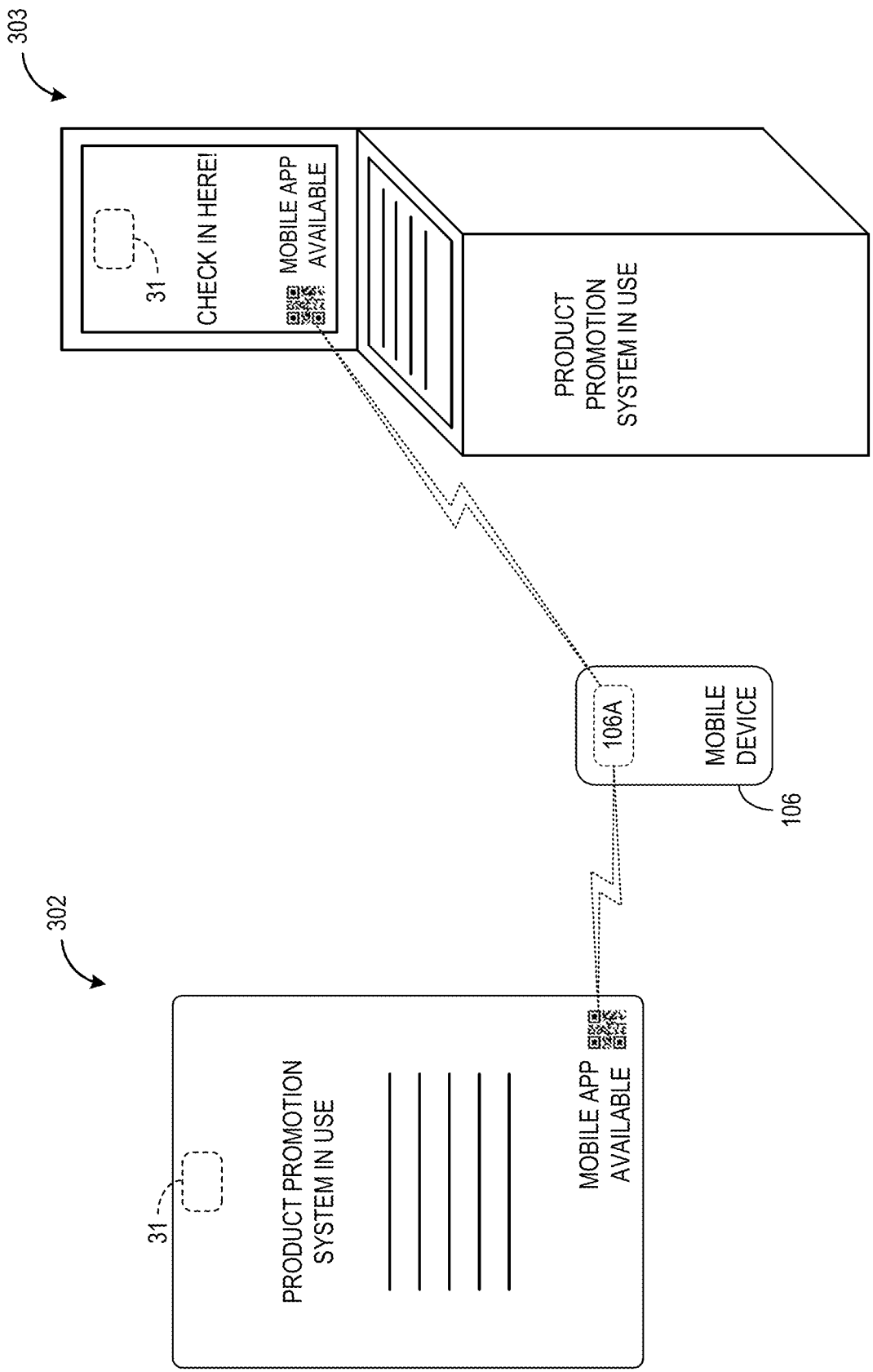

IN-STORE COMPUTERIZED PRODUCT PROMOTION SYSTEM WITH PRODUCT PREDICTION MODEL THAT OUTPUTS A TARGET PRODUCT MESSAGE BASED ON PRODUCTS SELECTED IN A CURRENT SHOPPING SESSION

BACKGROUND

Stores often stock many products to satisfy a variety of wants and needs of a large and diverse group of consumers. For example, a supermarket may stock more than 40,000 total products to accommodate the group of consumers. While a large number of total products may be desirable to serve the consumers as a group, individual consumers may typically only purchase hundreds of products in any given year, and as a result may experience frustration in trying to locate a few desired products out of the tens of thousands of products that may be available. Challenges exist in directing individual consumers toward specific products that they may desire. Stores may promote (e.g., via signs promoting a particular product) a selection of particularly popular products, products on sale, etc. However, by only selecting popular products to promote, less popular products may go unnoticed even though they may be highly desired by a subset of consumers. In fact, signage on promoted products may distract the eye of a particular shopper searching for a different product, making it even harder for the shopper to find what the shopper is looking for next. Furthermore, a shopping environment that contains too many in-store promotions may overwhelm consumers, further resulting in frustration. In view of these challenges, opportunities exist for improving in-store promotions, and improving the overall shopping experience for each shopper.

SUMMARY

To address the above issues, a computerized product promotion system for use in a store is provided. The system comprises one or more processors configured to receive a plurality of captured images of a shopper in a current shopping session in the store and process the plurality of captured images to determine one or more products selected by the shopper during the current shopping session. The one or more processors are further configured to determine an identity of at least one target product, selected by a product prediction model, that is estimated to have a threshold minimum likelihood of being purchased by the shopper during a remainder of the current shopping session. The product prediction model receives as input the one or more products selected by the shopper during the current shopping session and outputs the identity of the at least one target product. The one or more processors are further configured to output a message related to the target product for display on a target electronic device proximate the shopper and the target product to cause the target electronic device to display the message to the shopper.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3C is an example informational sign for the computerized product promotion system of FIG. 1 implemented in a shopping environment.

FIG. 3D is an example informational kiosk for the computerized product promotion system of FIG. 1 implemented in a shopping environment.

DETAILED DESCRIPTION

Figure 1:
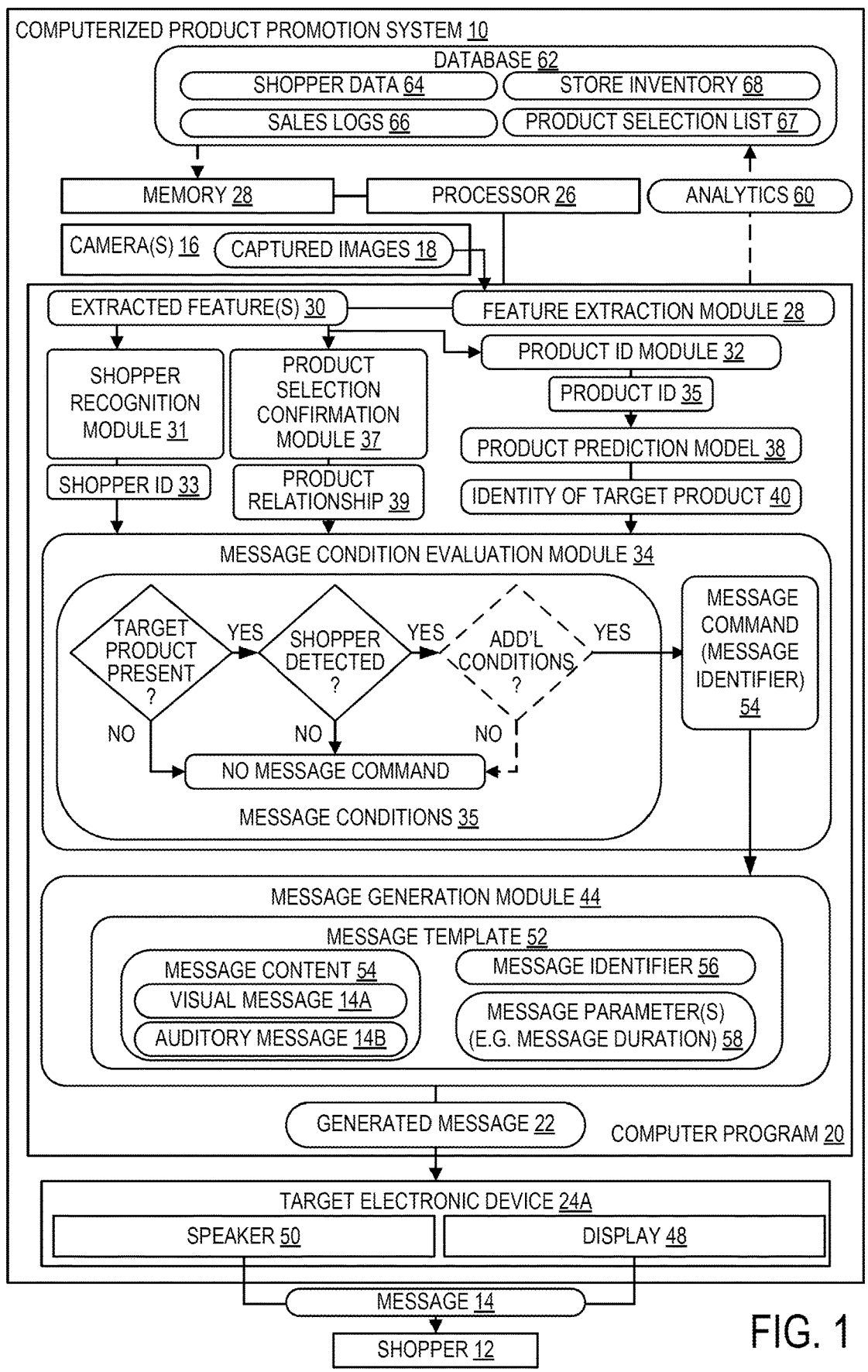
FIG. 1 is a schematic showing a computerized product promotion system for use in a store.

To address the issues discussed above, as shown in FIG. 1, a computerized product promotion system 10 for use in a store is provided, which presents to a shopper 12 a message 14 under certain conditions, as described below. The product promotion system 10 may operate in a store or retail environment. Generally, the product promotion system 10 includes a camera 16 which captures a plurality of captured images 18. The plurality of captured images 18 is analyzed by a computer program 20, and under certain conditions (e.g., the shopper 12 is near a product they are likely to purchase) a generated message 22 is sent to a target electronic device 24A of a plurality of electronic devices 24, each of which are associated with a unique product. The target electronic device 24A outputs the message 14 to the shopper 12 in order to prompt the shopper 12 to select the identified target product 36. While the embodiment of the product promotion system 10 described herein includes overhead cameras 16B as well as cameras 16A1, 16A2 on electronic device 24, it will be appreciated that an overhead camera 16B may not be included in other embodiments of the product promotion system 10, particularly those in which the inclusion of an overhead camera would complicate the installation and configuration of the product promotion system 10.

Continuing with FIG. 1, the computerized product promotion system 10 for use in a store comprises the camera 16, an electronic device 24, one or more processors 26, and associated memory 28 that stores a computer program 20 that when executed by the one or more processors 26 causes the computerized product promotion system 10 to perform the following processes. The one or more processors 26 are configured to receive a plurality of captured images 18 of a shopper 12 in a current shopping session in the store and process the plurality of captured images 18 to determine one or more products selected by the shopper 12 during the current shopping session. The plurality of captured images 18 are used as input into a feature extraction module 28 which extracts features and outputs the extracted feature 30 into a product identification module 32 and a shopper recognition module 31 which is configured to output a shopper identification 33. The product identification module 32 uses as input the extracted features 30 and outputs identities 35 of one or more products selected by the shopper during the current shopping session. The one or more processors 26 are further configured to determine an identity 40 of at least one target product 36, selected by the product prediction model 38, that is estimated to have a threshold minimum likelihood of being purchased by the shopper 12 during a remainder of the current shopping session. The product prediction model 38 is configured to receive as input the one or more products selected by the shopper 12 during the current shopping session, and output the identity 40 of the at least one target product 36. The one or more processors 26 are configured to, via a message conditions evaluation module 34 and a message generation module 44 that creates a generated message 22, output a message 14 related to the target product 36 for display on a target electronic device 24A proximate the shopper and the target product 36, to cause the target electronic device 24A to display the message 14 to the shopper 12.

The message generation module 44 creates the generated message 22 based upon a message template 52. The message template 52 includes message content 54 including at least one of a visual message 14A and an auditory message 14B. The message template 52 further includes a message identifier 56 based upon the identity 40 of the target product 36. The message template 52 further includes at least one message parameter 58. Possible message parameters 58 include message duration, wherein the duration that the message 14 is delivered is varied, message volume in the case of auditory message 14B, and message brightness in the case of a visual message 14A. Alternatively in the case of a visual message 14A, the message 14 may include a pulsing and/or illuminated textual message or image. In addition to pulsing, a variety of animated qualities may be imparted to the visual message 14A to cause it to stand out. If a quantity of shoppers reaches a predetermined threshold, the visual message 14A or image may be displayed in a color specific to an individual shopper 12 such that the shopper 12 may disregard other colors indicating products directed to other shoppers. The visual message 14A is displayed on a display 48 of the target electronic device 24A, and the auditory message 14B is projected by a speaker 50 of the target electronic device 24A. In some shopping environments, it may be desirable to have only a visual message 14A. For example, it may be distracting and/or bothersome to store associates and other shoppers to hear auditory messages 14B as they work or shop. Additionally, it may be difficult for shoppers to hear auditory messages over the ambient noise of a shopping environment, thereby causing them to miss desired target products. As such, the auditory message 14B may be configured to be disabled at the program level and/or at the user level.

The message condition evaluation model 42 is configured to determine that certain message conditions 35 are met, namely that the target product 36 is proximate the target electronic device 24A (target product present) and the shopper 12 is in the vicinity of the target electronic device 24A (shopper detected). The message condition evaluation module may as a result of determining that these two conditions are met, send a message command 54 to the message generation module. Alternatively, the message conditions evaluation module 34 be configured to determine that one or more additional message conditions 35 are met before sending the message command 54. Examples of additional message conditions 35 include number of shoppers 12 in a vicinity of the target electronic device 24A, a number of the target products 36 remaining on the shelf, and a detected speed of travel of the shopper 12, although various other message conditions 35 may be included. By using one or more additional message conditions 35, the target electronic device 24A is provided with a greater degree of message delivery flexibility and customization.

Figure 2A:
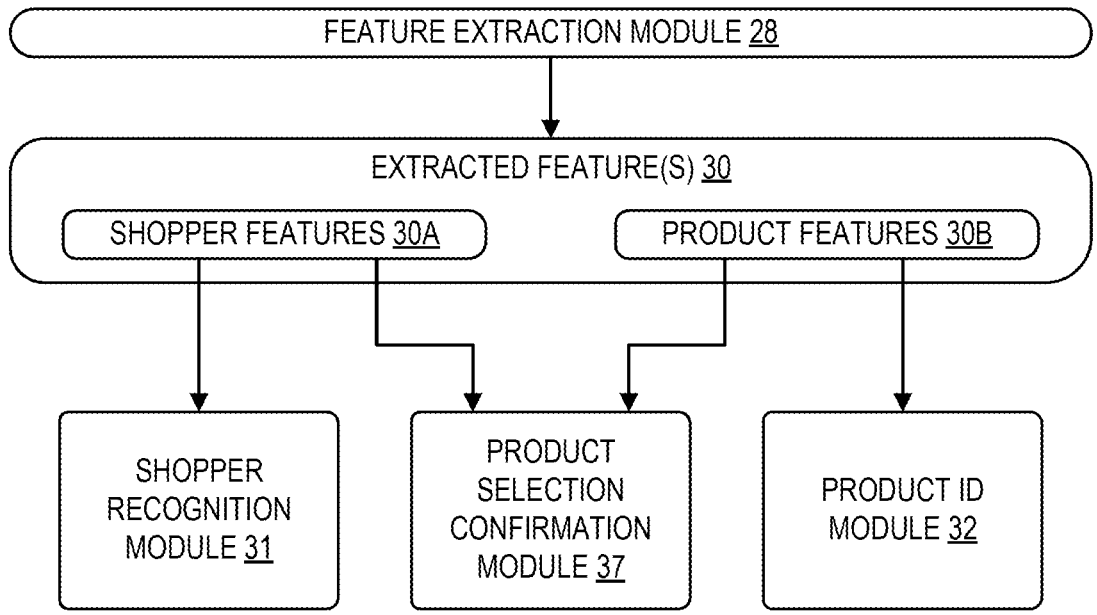
FIGS. 2A and 2B show additional details of the computerized product promotion system of FIG. 1.

As described above, the one or more processors 26 are configured to process the plurality of captured images 18 to determine one or more products selected by the shopper 12 during the current shopping session. As shown in FIG. 2A, this is performed by the one or more processors 26 being further configured to perform a first image processing to extract shopper features 30A from the image of the shopper 12, and from the extracted shopper features 30A, recognize the shopper 12, via a shopper recognition module 31, as distinct from other shoppers in the store by a probability threshold.

The one or more processors 26 are further configured to perform a second image processing to extract product features 30B from the image of the product, and from the extracted product features 30B, recognize the product, via the product identification module 32, as distinct from other products in the store by a probability threshold.

The one or more processors 26 are further configured to perform a third image processing, via a product selection confirmation module 37, to determine a product relationship 39 between the extracted product features 30B and the extracted shopper features 30A, to determine that the shopper 12 selected the product, and associate the selections of the recognized products with the recognized shopper on the current shopping trip. The product relationship 39 between the extracted product features 30B and the extracted shopper features 30A may be, for example, a synchronous movement of the shopper 12 and the recognized product(s) which indicates that the shopper 12 is carrying the recognized product on the shopper's person, in a bag, in a cart, etc. Additionally, or alternatively the product relationship 39 may be that the shopper 12 and the recognized product are determined to both be at a first position at a first point in time, and a second position at a second point in time. In this way, it can be determined that the shopper 12 has moved from one location to another with the recognized product and has therefore selected the recognized product.

Figure 2B:
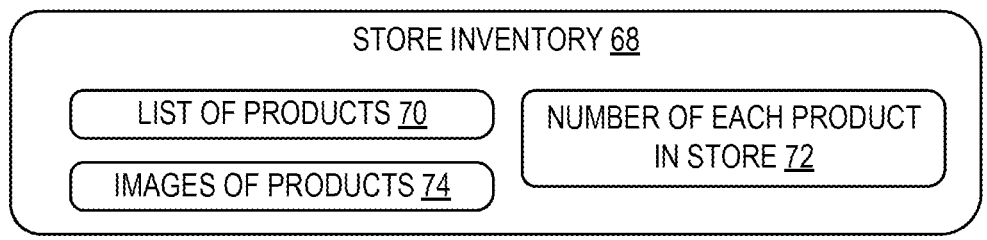

Data collected and generated by the computer program 20 is delivered as analytics 60 to a database 62. The database 62 includes shopper data 64, sales logs 66, a product selection list 67, and store inventory 68. As shown in FIG. 2B, the store inventory 68 includes a list 70 of products, a number 72 of each product in the store, and images 74 of each product in the store. A captured image of the shopper 12 may be used to recognize an identity of the shopper 12 by comparing extracted features from the captured image to extracted features of a stored image of the shopper which may be included in the shopper data 64. Additionally or alternatively, a secondary factor of identification may be used to recognize an identity of the shopper. Examples of secondary factors of identification include a membership or loyalty card of the shopper 12; a payment card such as credit card, debit card, or gift card; a shopper-supplied identification such as a phone number or membership number; and/or facial recognition of the shopper.

Figure 3A:
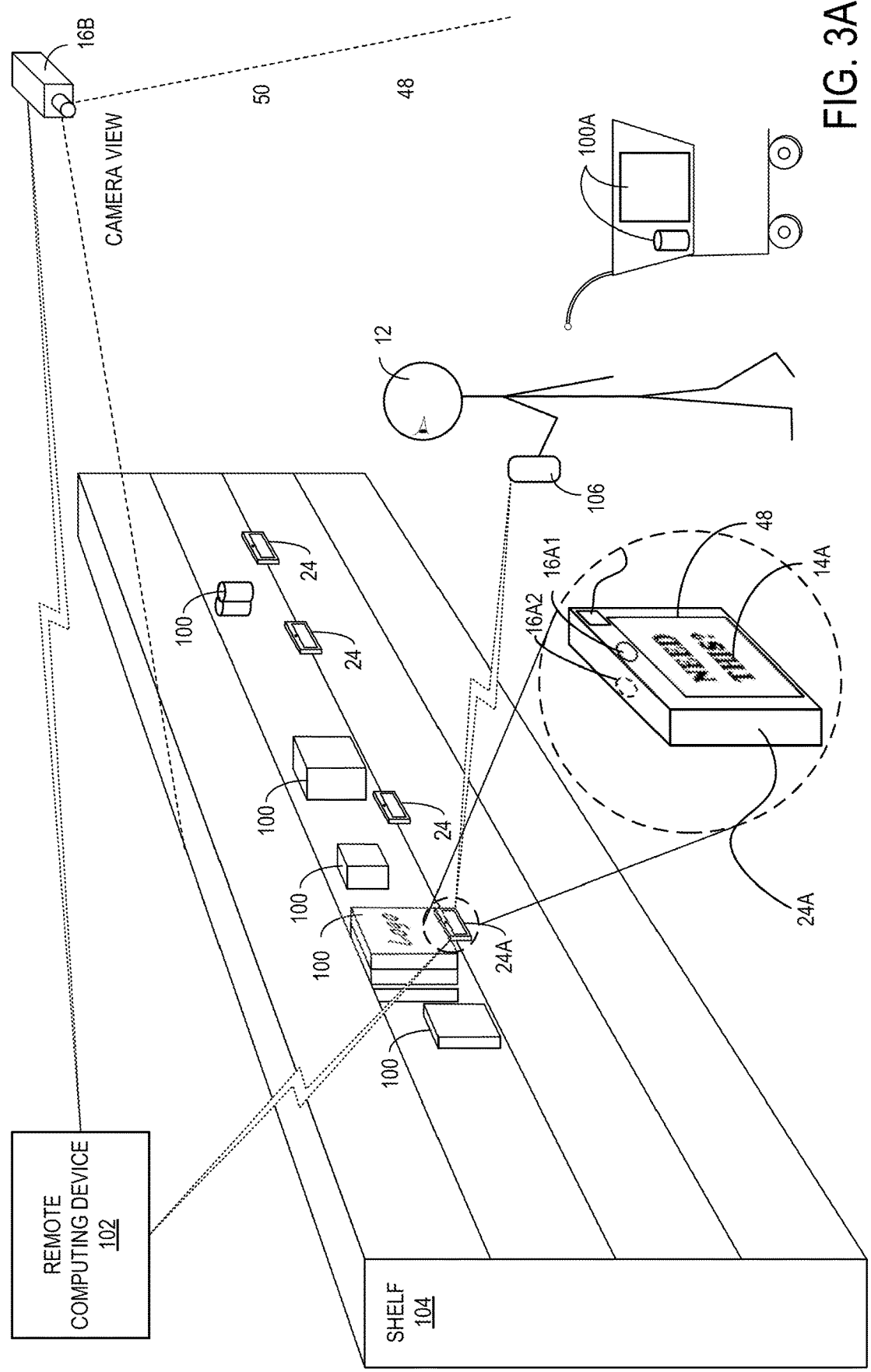
FIG. 3A is a perspective view showing one configuration of the computerized product promotion system of FIG. 1 implemented in an aisle of an example shopping environment.

Turning now to FIG. 3A, a perspective view of one embodiment of the product promotion system 10 is shown. In this embodiment, the computerized product promotion system includes a plurality of electronic devices 24 positioned adjacent respective products 100 in the store. The plurality of electronic 24 devices are connected to a remote computing device 102 via Wi-Fi, Bluetooth, or other suitable method. The remote computing device 102 may be a server, for example. The target electronic device 24A is a selected one of the plurality of electronic devices 24, and the one or more processors 26 includes respective electronic device processors in each of the plurality of electronic devices 24 and a remote computing device processor in the remote computing device 102.

In this embodiment, capturing the plurality of captured images 18 is performed by the camera 16 which may be a camera 16A of one of the plurality of electronic devices 24, and/or an overhead camera 16B. When included, the overhead camera 16B may be an existing security camera, for example; however, any suitable camera may be used. The camera 16 is in electronic communication with the remote computing device 102. A magnified view of the target electronic device 24A is provided, showing the display 48, the speaker 50, and the message 14. In this configuration, there are two cameras 16A, a front camera 16A1 and a rear camera 16A2. The rear camera 16A2 may capture images of products on the shelf 104, while the front camera 16A1 may capture images of the shopper and products 100A selected by the shopper. However, the plurality of electronic devices 24 may also be configured with only the rear camera 16A2, only the front camera 16A1, or with no camera 16. Regardless of the number of cameras 16 included in the plurality of electronic devices 24, the overhead camera 16B may be included in the computerized product promotion system 10.

When included, it is preferable that the overhead camera 16B be relatively unintrusive to the shopper and any store associates, as well as compatible with other existing electronic shopping assistance devices that may be in use. While the embodiment of the product promotion system 10 shown in FIG. 3A includes the overhead camera 16B, it will be appreciated that the product promotion system 10 may be implemented without the overhead camera 16B for simplicity of installation and configuration.

Additionally, the plurality of electronic devices 24 are configured to communicate directly with a mobile device 106 of the shopper 12 via Bluetooth, Wi-Fi, near field communication (NFC), or any other suitable communication method. The mobile device 106 may be implemented, for example, as a mobile phone, tablet computer, smart wristwatch, head mounted augmented reality display, or another suitable mobile device. In this way, the computerized product promotion system 10 is configured to determine the identity of the shopper by a media access control (MAC) address of the mobile device 106 of the shopper 12.

In this embodiment, receiving a plurality of captured images 18 is performed by processors 26 of the plurality of electronic devices 24 or by the processor 26 of the remote computing device 102. Processing the plurality of captured images 18 is performed by processors 26 of the plurality of electronic devices 24 or by the processor 26 of the remote computing device 102. Determining an identity 40 of at least one target product 36 is performed by the processor 26 of the target electronic device 24A or by the processor 26 of the remote computing device 102. Outputting the message 14 related to the target product 36 for display is performed by the processor 26 of the target electronic device 24A or by the processor 26 of the remote computing device 102.

Figure 3B:
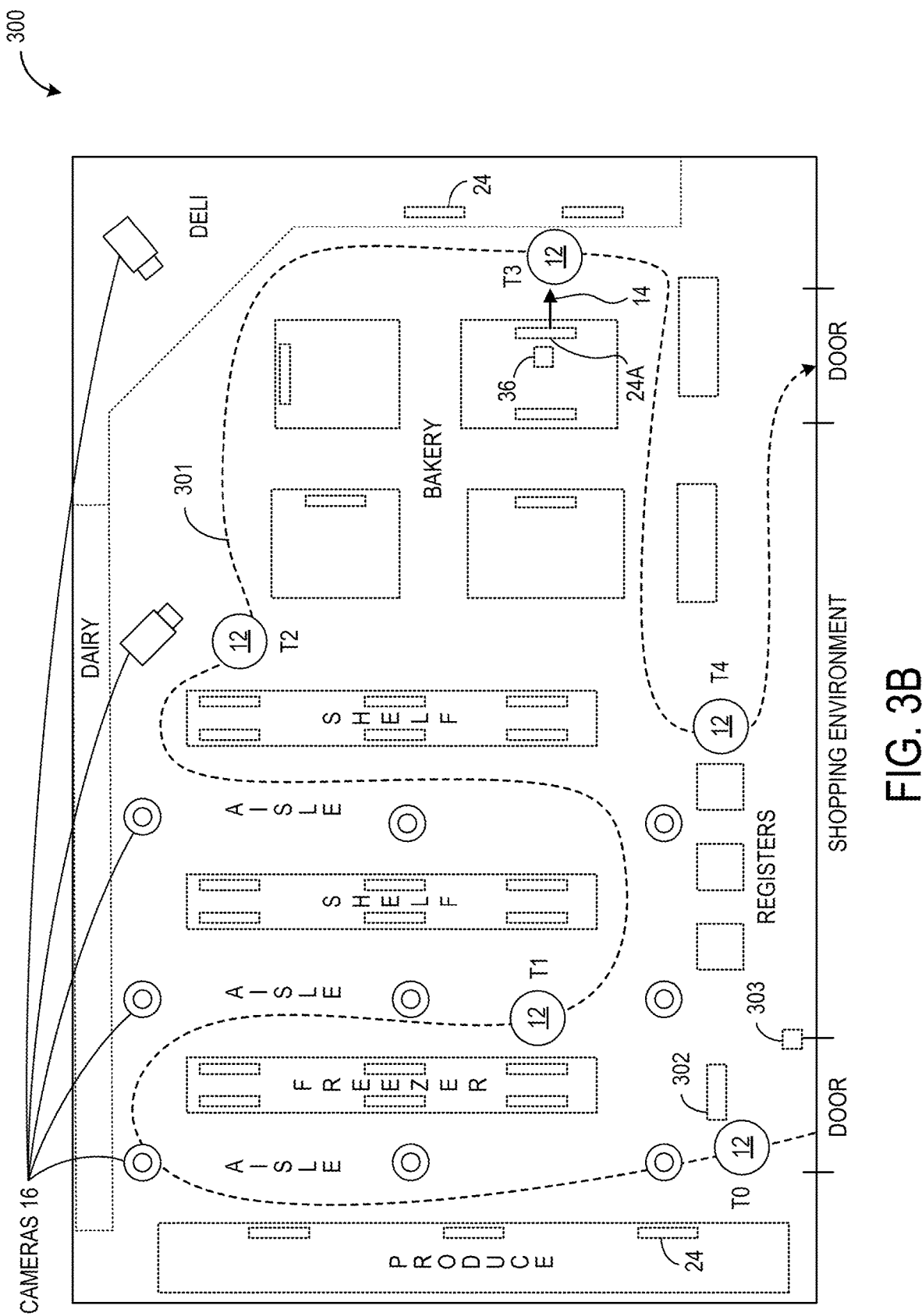
FIG. 3B is an overhead view of the computerized product promotion system of FIG. 1 implemented in an example shopping environment.

FIG. 3B is an overhead view showing the shopper 12 traveling along a shopper path 301 through the shopping environment 300 at different time points (T0-T4). In the example illustrated in FIG. 3B, the shopping environment is a grocery store; however, it will be appreciated that the shopping environment 300 may be any type of store selling merchandise. Upon entering the shopping environment 300, the shopper 12 may be informed that the product promotion system 10 is in operation in the shopping environment 300, which may track and suggest products to the shopper 12 during the shopping session via target electronic devices 24A associated with products in the shopping environment 300. Such information may be displayed on a physical sign 302 or the like posted near entrances of the shopping environment 300. As shown in FIG. 3C, the sign 302 may include information about the product promotion system 10, and may include a platform such as a QR code to allow a shopper 12 to download and install an associated application 106A for their mobile device 106. The shopper recognition module 31 may be included on or near the sign 302. Additionally or alternatively, information about the product promotion system 10 may be displayed electronically via a kiosk 303 positioned near the entrance of the shopping environment 300. As shown in FIG. 3D, the kiosk 303 may display a code such as a QR code to enable a shopper 12 to download and install an associated application 106A for their mobile device 106 from a cloud server platform. The kiosk 303 may also allow mobile-engaged shoppers, described in detail below, to check in and set preferences for their shopping trip.

Many conventional mobile applications directed to in-store shopping have had low success in market adoption, which may be attributed to the applications and their associated systems being configured as an "all or nothing" experience. The product promotion system 10 disclosed herein addresses the challenge of market adoption by allowing each shopper to choose their desired level of engagement with the product promotion system 10, thereby providing the shopper a degree of autonomy not afforded by conventional mobile shopping applications. When opting to use the associated mobile application 106A, the shopper 12 may further customize the level of assistance and communication that is provided while shopping. In a store in which the product promotion system 10 is implemented, the shopper 12 may choose to engage with the product promotion system 10 during a shopping trip at one of a plurality of different levels, such as the three levels described below.

In a first level of engagement, the shopper 12 is mobile application-engaged, meaning that they have opted into a program and downloaded the associated mobile application 106A to their mobile device 106 for use with the product promotion system 10. As such, the shopper 12 understands that the store has purchase prompts located throughout, and that the product promotion system 10 is tracking the shopper 12 and their purchases to predict products and suggest target products 36 to the shopper 12 via target electronic devices 24A. The mobile application 106A may also permit the shopper 12 to choose a level of assistance of the product promotion system 10 during the shopping trip, such as highlighting products on the shopper's list, showing top selling products in each category, and identifying products that meet specified criteria (i.e., gluten free, vegan, nut free, dairy free, and the like), for example. Additionally or alternatively, a mobile application-engaged shopper may set their preferred level of assistance via the kiosk 303 at the entrance of the shopping environment 300.

As the shopper 12 shops, the product promotion system 10 may be configured to communicate suggestions for one or more predicted products to the shopper 12 via the mobile application 106A, as well as information to help the shopper 12 identify predicted products via unique characteristics of the visual message 14A associated with a target product 36. The mobile application 106A may further provide the shopper 12 with the location of the predicted products in the shopping environment 300. As the shopper 12 approaches a predicted product, i.e., target product 36, a message 14A1 may be displayed on the target electronic device 24A associated with the target product 36. As described above and shown in FIG. 3E, the message 14A1 may display, for example, the identity of the target product 36 as a pulsing and/or illuminated textual message or image. The message 14A1 may further include animation and/or be displayed in a color specific to the shopper 12. The identity of the target product 36 may include the product name and/or the number 72 associated with the product in the store inventory 68.

Figure 3E:
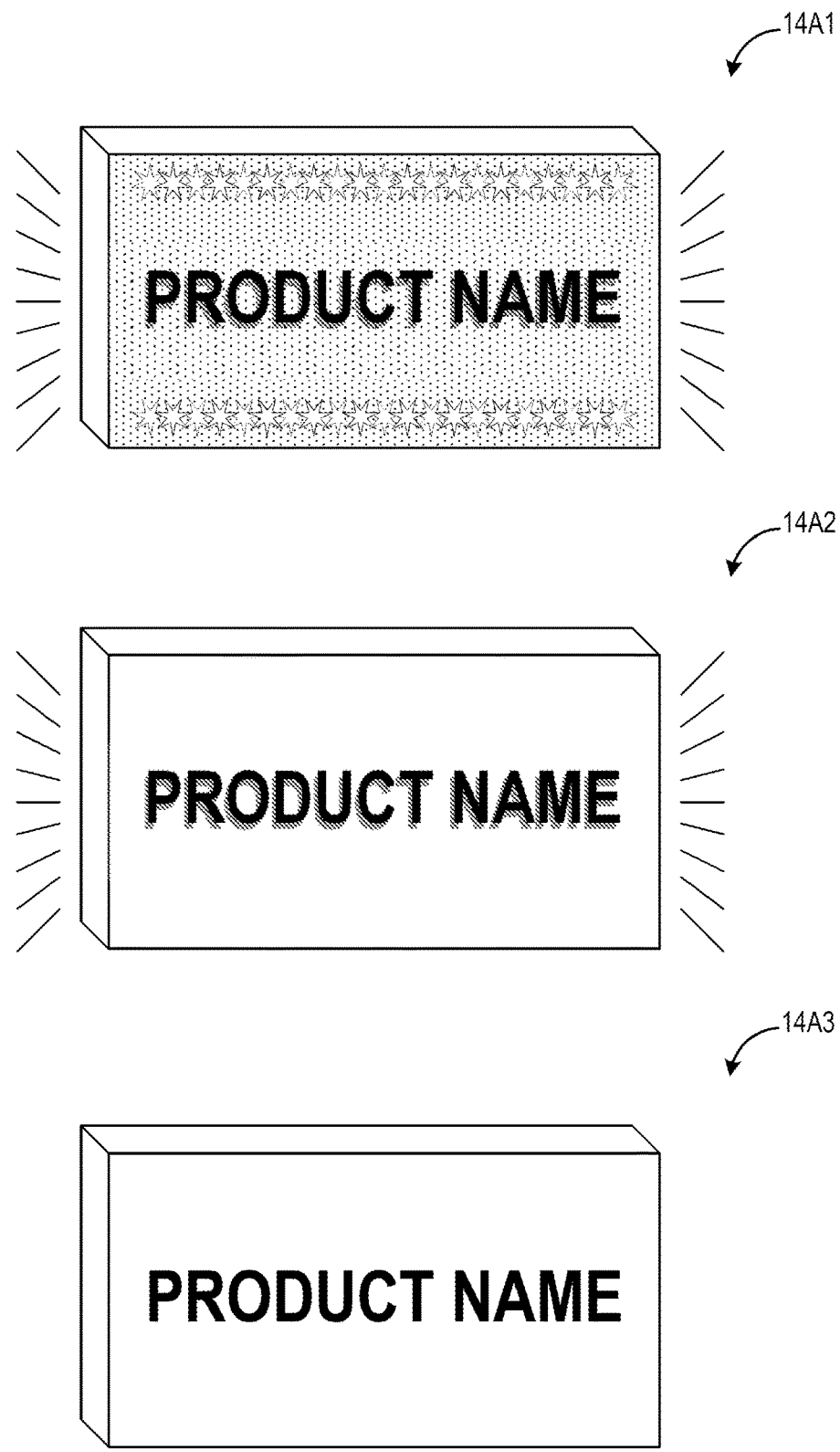
FIG. 3E shows example visual messages based on a level of engagement with the computerized product promotion system of FIG. 1.

In a second level of engagement, the shopper 12 is non-mobile application-engaged, meaning that they have opted into a program, but have not downloaded the associated mobile application 106A. As with the mobile application engagement level described above, the shopper 12 understands that the store has purchase prompts located throughout, and that the product promotion system 10 is tracking the shopper 12 and their purchases to predict products and suggest target products 36 to the shopper 12 via target electronic devices 24A. However, the non-mobile application-engaged shopper 12 does not receive application-enabled suggestions for one or more predicted products or information to help them identify predicted products. As the shopper 12 approaches a predicted product, the predicted product is identified as a target product 36 if the message conditions evaluation module 34 determines that the message conditions 35 are satisfied. As shown in FIG. 3E, similar to the mobile application-engaged shopper, the non-mobile application-engaged shopper 12 may see a message 14A2 displayed on the target electronic device 24A associated with the target product 36. The message 14A2 for the non-mobile application-engaged shopper may display, for example, the identity of the target product 36 as an illuminated textual message or image. Unlike the message 14A1, the message 14A2 does not include animation and is not displayed in a color specific to the shopper 12.

In a third level of engagement, the shopper 12 is passive with regard to the product promotion system 10, has not opted into a program, and has not downloaded the associated mobile application 106A. In this implementation, the shopper is recognized as an unidentified, non-participant shopper 12A. When the non-participant shopper 12A is within proximity of a product with an associated electronic device 24, the device 24 is configured to display a general message 14A3 for the product, such as the identity of the product, without illumination, animation, color, or the like, as shown in FIG. 3E. However, it will be appreciated that the non-participant shopper 12A may see message 14A1 and/or 14A2 if a nearby engaged shopper 12 triggers a message for a target product 36 when they are recognized by a target electronic device 24A.

Figure 3F:
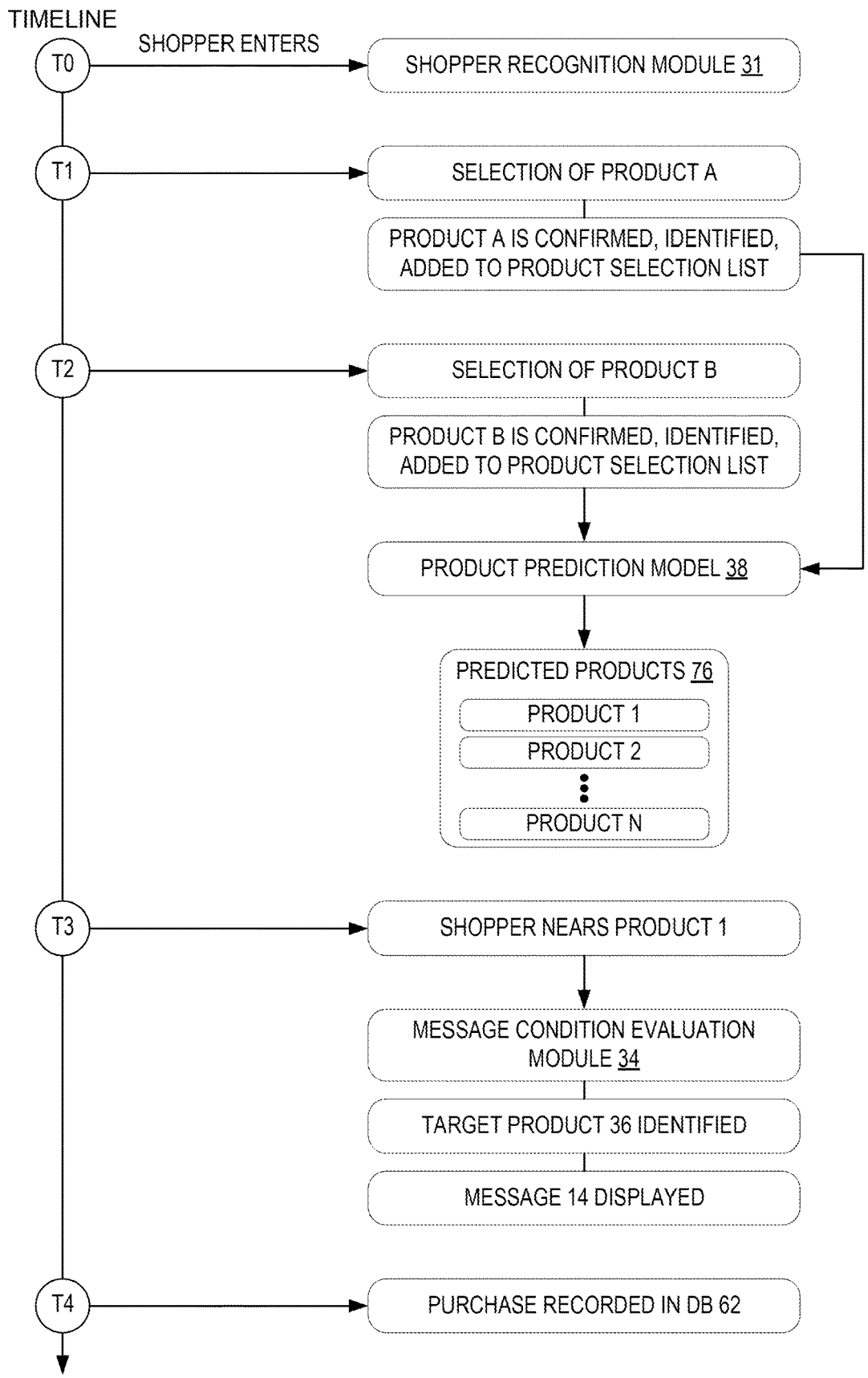
FIG. 3F is an example timeline of operations of the computerized product promotion system of FIG. 1 during a shopping trip.

Returning to FIG. 3B, a detailed description of operations performed by the product promotion system 10 at each time point (T0-T4) as the shopper 12 selects products and travels through the shopping environment 300 is provided below. A corresponding timeline of the operations is illustrated in FIG. 3F. In the example shopping experience described herein, it will be appreciated that the shopper 12 is a mobile application-engaged shopper or a non-mobile application-engaged shopper 12 (i.e., the shopper 12 is not a non-participant shopper 12A).

At T0, the shopper 12 enters the shopping environment, and is recognized by the shopper recognition module 31 via a plurality of shopper images as described above. The plurality of shopper images is captured by cameras 16, which may include overhead cameras 16B, as well as cameras 16A1 and/or 16A2 of the plurality of electronic devices 24. As an example, cameras 16 are shown near doors, above aisles, in shelves, and near registers of the shopping environment; however, it will be appreciated that other arrangements of cameras 16 may be used. For example, the entrances of grocery stores are typically positioned near a perishable area such as a produce section, deli, or the like. These areas are often open areas comprised of display tables rather than tall shelves, which may present a challenge when positioning the cameras 16 to capture the plurality of shopper images. As such, the cameras 16 may be additionally or alternatively mounted on stanchions, at locations on the wall above open areas, on ceiling mounts, and the like, for example.

At T1, the shopper 12 makes a first selection of a first product (Product A) from a freezer section of the shopping environment, and the first selection is confirmed by the product selection confirmation module 37. The first product is identified by the product identification module 32 and added to the product selection list 67.

At T2, the shopper 12 makes a second selection of a second product (Product B) from a shelf in the dry goods section of the shopping environment, and the second selection is confirmed by the product selection confirmation module 37. The second product is identified by the product identification module 32 and added to the product selection list 67.

Identities of Products A and B are used by the product prediction model 38 to generate a list 76 of predicted products that may be suggested to the shopper 12 during the shopping session. For example, Product A may be a package of frozen Italian-style meatballs, and Product B may be a jar of marina sauce. Based on these selections, the list 76 of predicted products may include pasta, provolone cheese, parmesan cheese, mozzarella cheese, fresh basil, Italian bread, dinner rolls, hoagie rolls, and/or gelato, for example. It will be appreciated that items included in the list 76 of predicted products may change during the shopping trip in accordance with products selected by the shopper 12. For example, predicted products may be added to the list 76 as the shopper selects additional products, and predicted products may be removed from the list 76 when selected by the shopper 12 and/or if the shopper 12 passes by them and they are not selected.

At T3, the shopper 12 is in a bakery section of the shopping environment near a table display of Italian bread (Product 1) included in the list 76 of predicted products. The message conditions evaluation module 34 determines that the message conditions 35 are satisfied, the predicted product is identified as a target product 36, and the message 14 regarding the target product 36 is displayed to the shopper 12 via the target electronic device 24A. As described above and shown in FIG. 3E, the message 14 may be a visual message 14A1. The shopper 12 may see the message and select the Italian bread. At T4, the shopper completes their shopping trip and purchases their selected products. The purchase, including the identities of the selected products, is recorded as sales logs 66 in the database 62.

As described above, the electronic devices 24 may be associated with products located in various departments of the shopping environment 300. Thus, the electronic devices 24 may be configured according to their environment. For example, an electronic device 24 for a non-perishable product on a shelf or a bazaar display may be mounted to the shelf or front of the display via a clip, adhesive, magnet, or the like. Electronic devices 24 for products in an open refrigerated case, such as meat or dairy, may be likewise attached to a shelf near the associated product. For products in the freezer section, electronic devices 24 may be arranged on the outside of a freezer door or attached to a handle of the freezer door. Additionally or alternatively, the electronic devices 24 may be configured for use in low temperatures such that they may be attached to a shelf inside the freezer near the associated product. Electronic devices 24 in the produce area may be adapted to be water-resistant or waterproof such that they may be used in the presence of a produce mist system. In departments in which products are displayed on tables, such as a bakery, the electronic devices 24 may be configured with a table top mount. In shopping environments utilizing an electronic shelf label (ESL) system or other electronic technology for tagging products, the electronic devices 24 may be embedded in the existing electronic system. It will be appreciated that the electronic devices 24 are not limited to the examples provided above, and may be mounted or displayed in any a number of configurations suitable to the environments in which the associated products are stocked.

Figure 4:
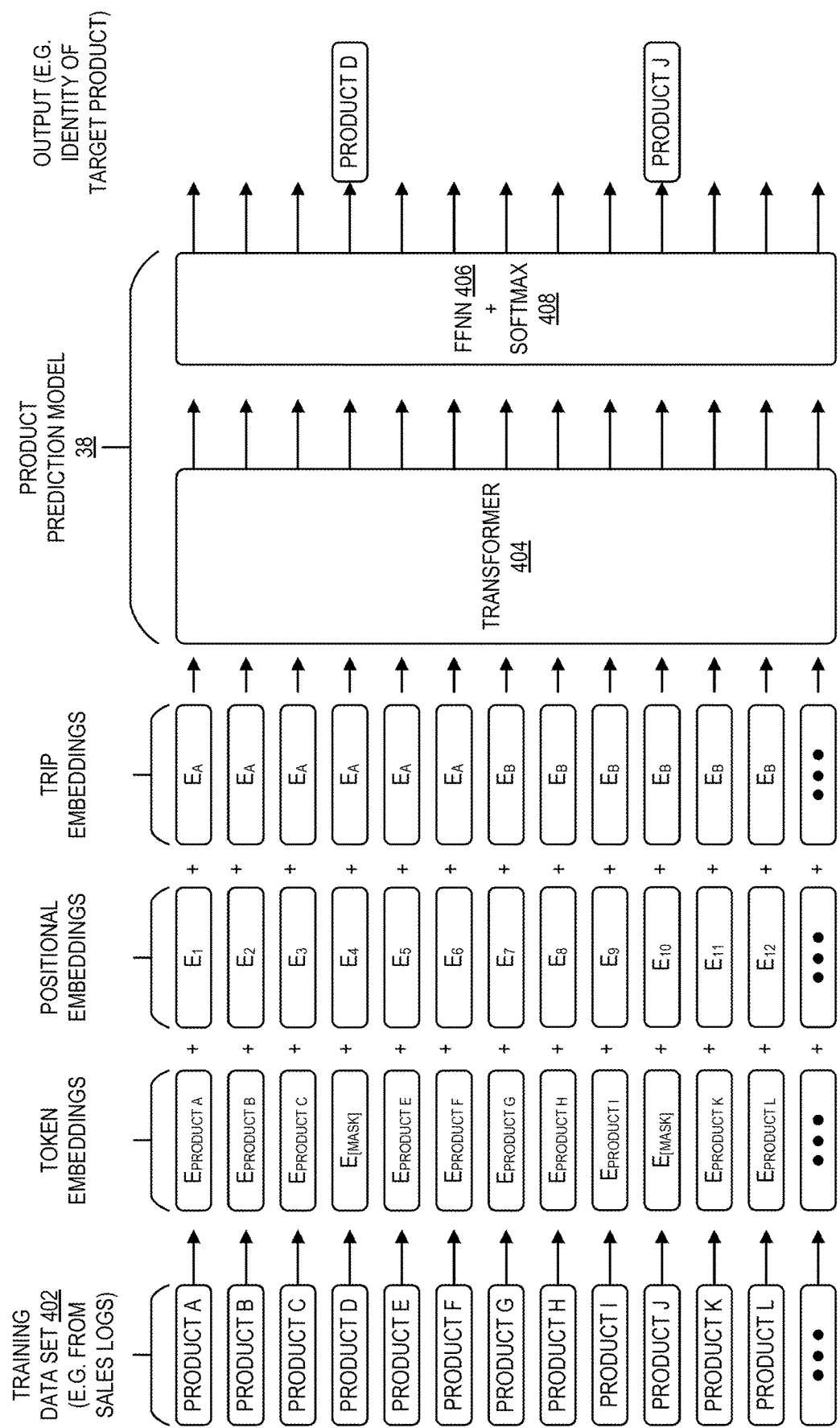
FIG. 4 is a schematic drawing showing a product prediction model included in the computerized product promotion system of FIG. 1.

As previously described, in order to perform the above functions, the product prediction model 38 receives as input the one or more products selected by the shopper 12 during the current shopping session and outputs the identity 40 of the at least one target product 36. FIG. 4 shows details of the product prediction model 38 trained to indicate a likelihood of a product being selected next in a shopping trip, given a prior selection history. During a training phase, the product prediction model 38 is trained based on a training data set 402 that includes for each of multiple shopping trips, a set of products purchased by a set of shoppers. The training data set 402, may be produced from sales logs 66 stored in the database 62 of the computerized product promotion system 10. For clarity, FIG. 4 shows only twelve products selected by shoppers used in the training data set 402; however, it will be appreciated that the training data set 402 may include hundreds or thousands of products selected by shoppers.

In this example, the product prediction model 38 is given the task of predicting two products, Products D and J. Each of the products is assigned a token embedding, a positional embedding, and a trip embedding. The token embedding indicates the identity 40 of the target product 36. Because the product prediction model 38 is tasked with predicting the two products, a mask token is assigned to those products whose identities are not inputted. In this example, the training data set is a time-ordered list of products purchased by a shopper 12, and positional embeddings are assigned that indicate the order in which the products were chosen by the shopper 12, with $E_1$ assigned to the first product, $E_2$ assigned to the second product, etc. The product prediction model 38 further uses as input a shopping history over multiple shopping trips, therefore trip embeddings are assigned that indicate the shopping trip in which the product was selected. In this example, Products A-F were selected during a first shopping trip and are therefore assigned the trip embedding $E_A$, while Products G-L were selected during a second shopping trip and are therefore assigned the trip embedding $E_B$. The embeddings are used as input into a transformer 404 that uses an attention mechanism to learn a contextual relationship between products selected by shoppers. In conjunction, the transformer 404, a feed-forward neural network 406, and SoftMax layer 408 determine the identity 40 of the at least one target product 36 that is likely to be purchased by the shopper 12 as well as a probability or likelihood that the at least one target product 36 will be purchased by the shopper 12. The message conditions evaluation module 34 may be configured such that the one or more additional conditions include a minimum threshold for the likelihood of the at least one target product 36 of being purchased by the shopper 12.

While certain combinations of products may be purchased by a majority of shoppers, it will be appreciated that single shoppers or demographic cohorts of shoppers may purchase different combinations of products. Therefore, in training the product prediction model 38, the set of shoppers includes, a single shopper, a demographic cohort of shoppers, and/or all shoppers for which data is available. As a result, for any given one or more products selected by the shopper, the product prediction model 38 may output the identity 40 of a target product 36 based upon the identity of the shopper 12. This will be explained further using the following examples.

In a first example, a single shopper is identified having a shopping history. In this case, the product prediction model 38 is configured to output the identity 40 of the at least one target product 36 based upon the shopping history of the single shopper. All identifiable single shoppers having a shopping history may be used to train the product prediction model 38.

In a second example, a single shopper is identified, but has no shopping history. No shopping history may be available because the single shopper may have never entered the store before or may have never made a purchase in the store, for example. However, the single shopper may be identified as belonging to a demographic cohort (e.g. within a particular age range, or of a particular gender). In this case, the product prediction model 38 is configured to output the identity 40 of the at least one target product 36 based upon the demographic cohort of shoppers to which the single shopper belongs.

In a third example, a single shopper is identified in a store, but no shopping history is available for the single shopper, and the single shopper does not belong to a demographic cohort. In this case, the product prediction model 38 outputs the identity 40 of the at least one target product 36 based on all shoppers for which data is available.

Figure 5A:
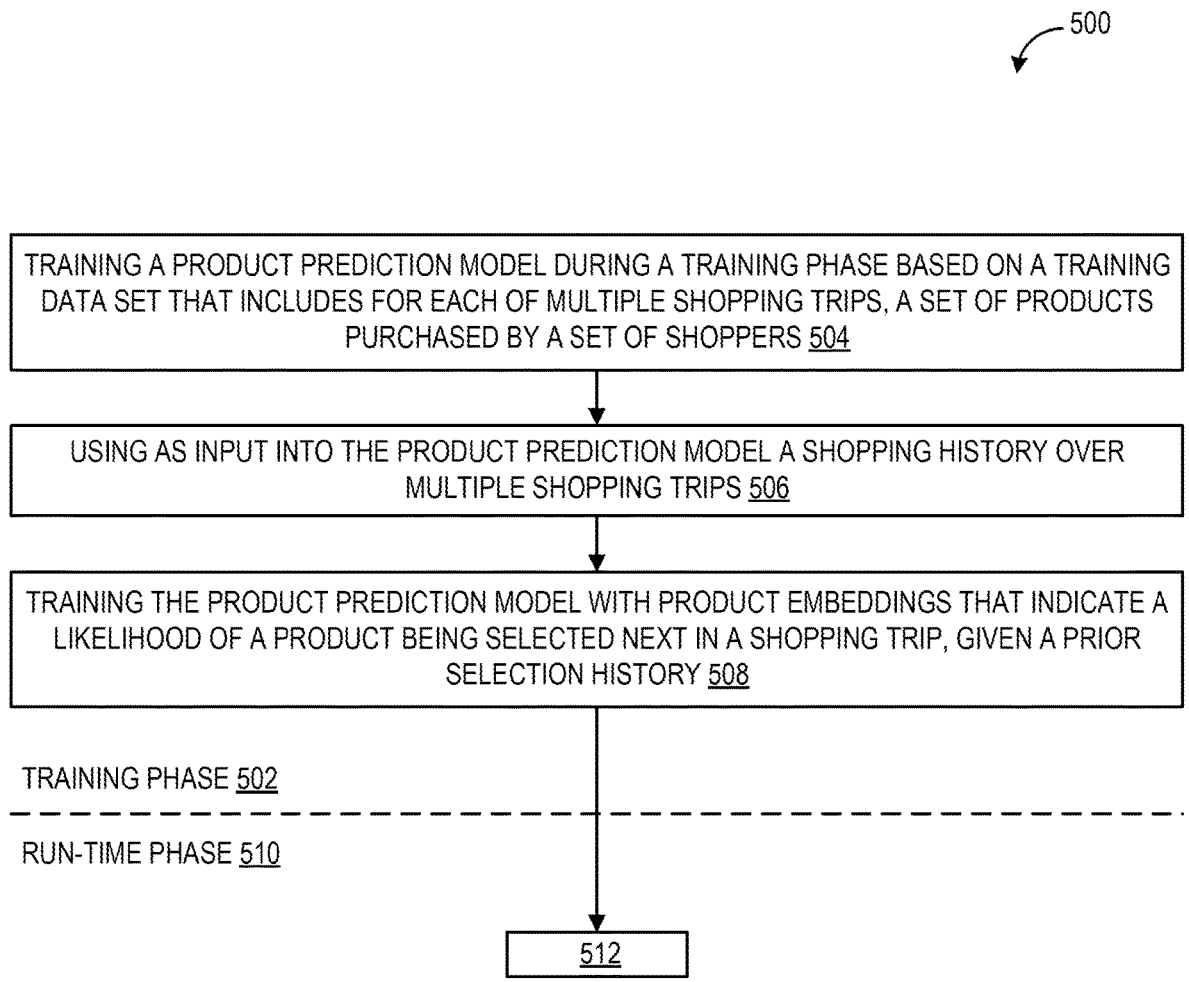
FIGS. 5A-5C show a flowchart for a method for executing a product promotion system which may be implemented by the computerized product promotion system of FIG. 1.
Figure 5B:
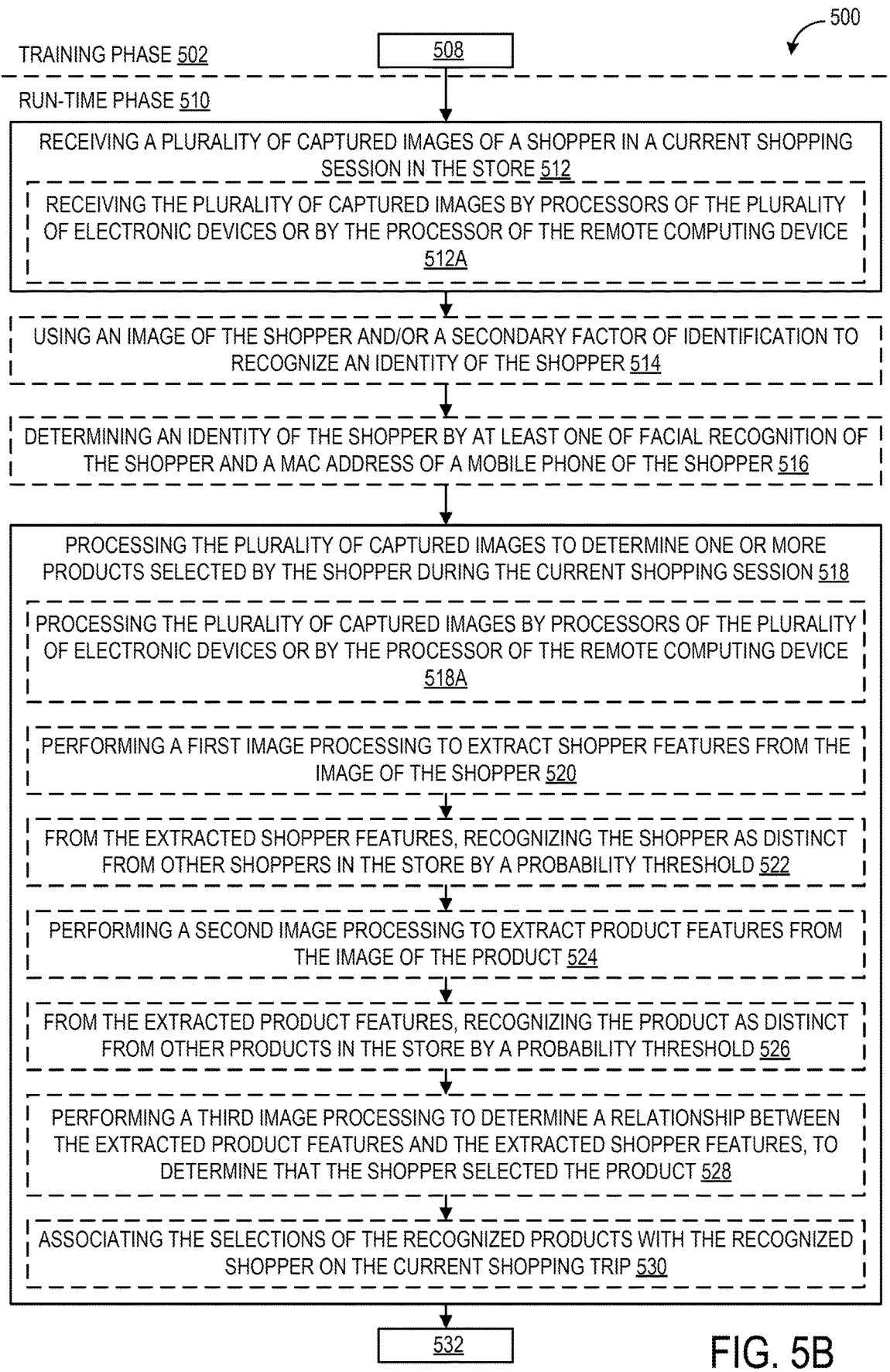
Figure 5C:
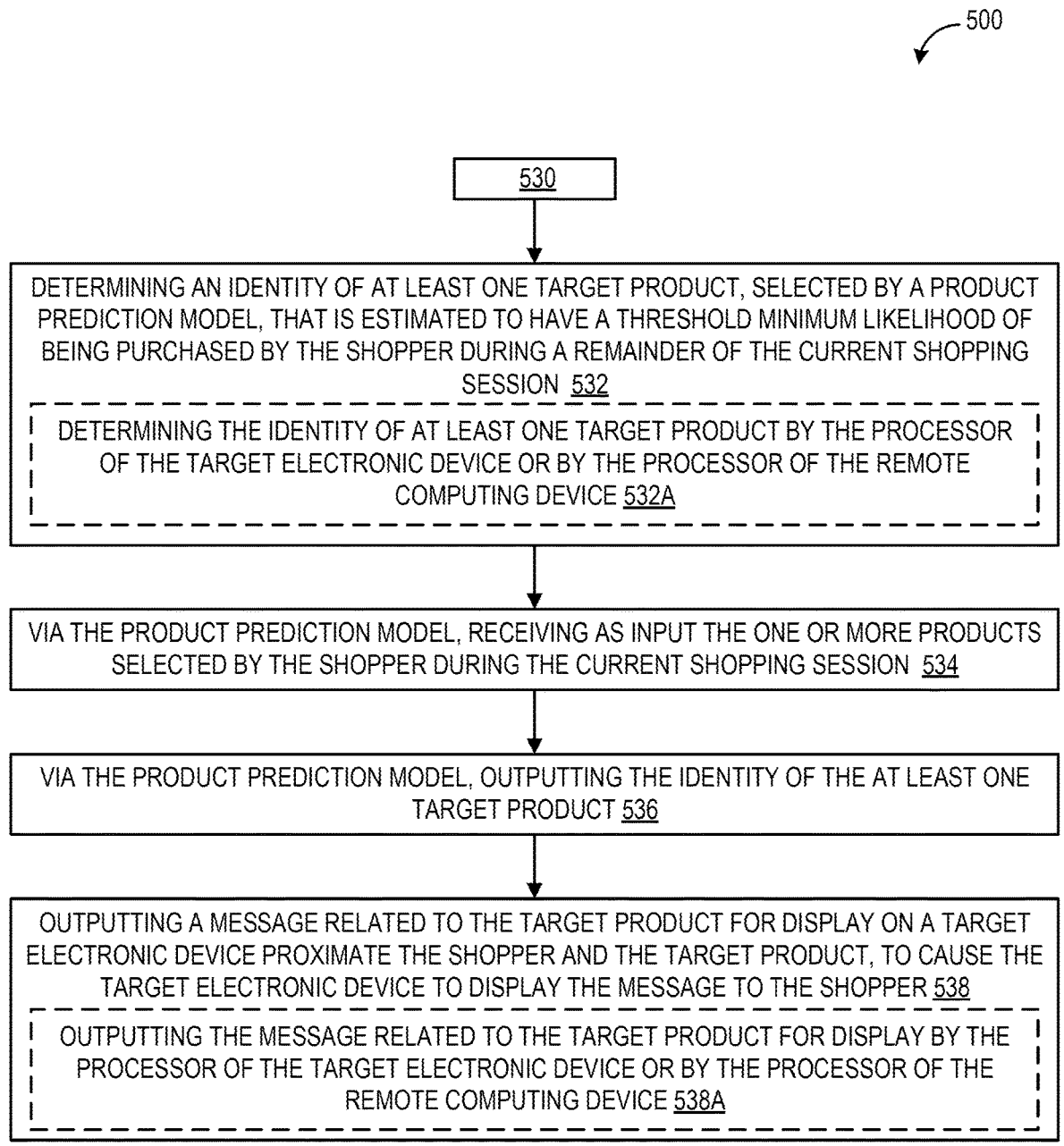

Turning now to FIGS. 5A-C, a method 500 for executing a product promotion system for use in a store will now be described. It will be appreciated that the method 500 may be implemented using the above described product promotion system 10 or other suitable hardware and software componentry. One example configuration that may be used to implement the method 500 comprises a plurality of electronic devices positioned adjacent respective products in the store which are connected to a remote computing device, wherein a target electronic device is a selected one of the plurality of electronic devices. The example configuration further comprises one or more processors including respective electronic device processors in each of the electronic devices and a remote computing device processor in the remote computing device. The method 500 comprises a training phase 502. At 504, the training phase 502 comprises training a product prediction model during a training phase based on a training data set that includes for each of multiple shopping trips, a set of products purchased by a set of shoppers. The training data set may be a time-ordered list of products purchased by a shopper. The set of shoppers includes a single shopper, a demographic cohort of shoppers, and/or all shoppers for which data is available. At 506, the training phase 502 further comprises using as input into the product prediction model a shopping history over multiple shopping trips. At 508, the training phase 502 further comprises training the product prediction model with product embeddings that indicate a likelihood of a product being selected next in a shopping trip, given a prior selection history.

At 510, the method 500 further comprises a run-time phase 510. At 512, the run-time phase 510 comprises receiving a plurality of captured images of a shopper in a current shopping session in the store. Step 512 may be performed by, as shown for example at 512A, receiving the plurality of captured images by processors of the plurality of electronic devices or by the processor of the remote computing device. At 514, the run-time phase 510 further comprises using an image of the shopper and/or a secondary factor of identification to recognize an identity of the shopper. At 516, the run-time phase further comprises determining an identity of the shopper by at least one of facial recognition of the shopper and a MAC address of a mobile device of the shopper. At 518, the run-time phase 510 further comprises processing the plurality of captured images to determine one or more products selected by the shopper during the current shopping session. Step 518 may be performed by, as shown for example at 518A, processing the plurality of captured images by processors of the plurality of electronic devices or by the processor of the remote computing device. At 520, the run-time phase 510 further comprises performing a first image processing to extract shopper features from the image of the shopper. At 522, the run-time phase 510 further comprises from the extracted shopper features, recognizing the shopper as distinct from other shoppers in the store by a probability threshold. At 524, the run-time phase 510 further comprises performing a second image processing to extract product features from the image of the product. At 526, the run-time phase 510 further comprises from the extracted product features, recognizing the product as distinct from other products in the store by a probability threshold. At 528, the run-time phase 510 further comprises performing a third image processing to determine a product relationship between the extracted product features and the extracted shopper features, to determine that the shopper selected the product. At 530, the run-time phase 510 further comprises associating the selections of the recognized products with the recognized shopper on the current shopping trip. At 532, the run-time phase 510 further comprises determining an identity of at least one target product, selected by a product prediction model, that is estimated to have a threshold minimum likelihood of being purchased by the shopper during a remainder of the current shopping session. Step 532 may be performed by, as shown for example at 532A, determining the identity of at least one target product by the processor of the target electronic device or by the processor of the remote computing device. At 534, the run-time phase 510 further comprises via the product prediction model, receiving as input the one or more products selected by the shopper during the current shopping session. At 536, the run-time phase 510 further comprises via the product prediction model, outputting the identity of the at least one target product. At 538, the run-time phase 510 further comprises outputting a message related to the target product for display on a target electronic device proximate the shopper and the target product, to cause the target electronic device to display the message to the shopper. Step 538 may be performed by, as shown for example at 538A, outputting the message related to the target product for display by the processor of the target electronic device or by the processor of the remote computing device.

The systems and methods described above may be used to present a targeted message to a shopper based upon the products selected by that shopper during a current shopping trip. This is useful to the shopper because it provides a customized prediction for that particular shopper on that particular shopping trip, and presents a message that helps the shopper locate a product that has been determined to be a likely purchase for that shopper at that point in time. As a result, an efficient shopping experience can be realized.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
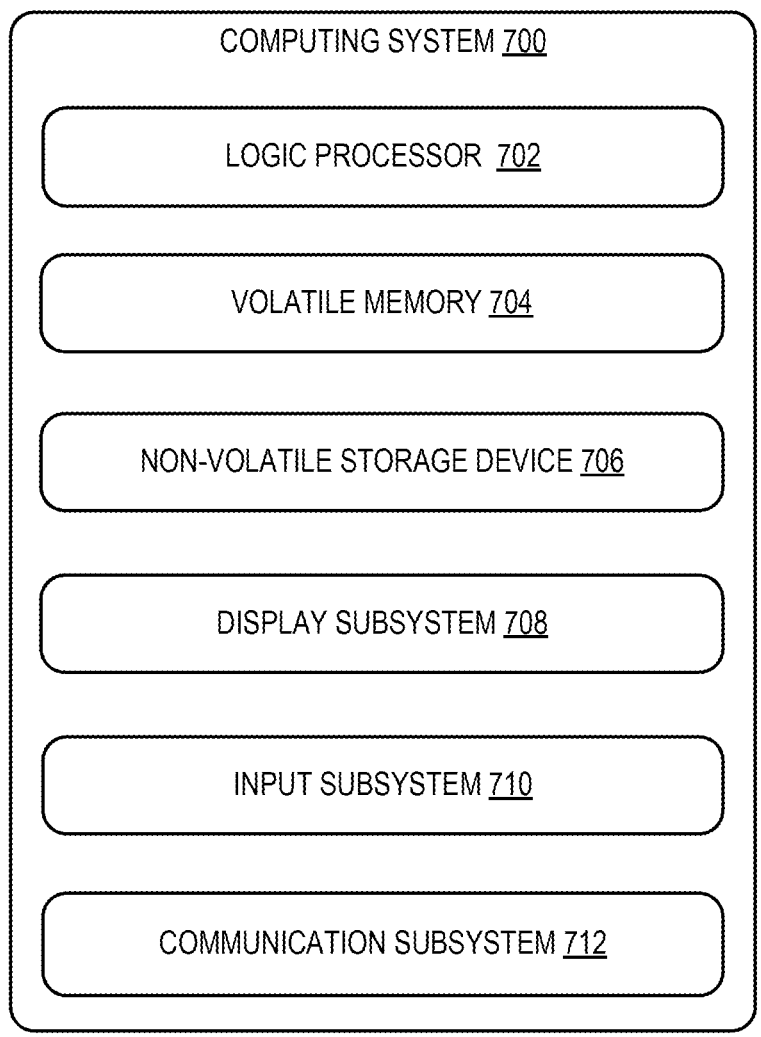
FIG. 6 illustrates an exemplary computing environment in which the computerized product promotion system of FIG. 1 may be implemented.

FIG. 6 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 6.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor. When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The invention claimed is:

1. A computerized product promotion system for use in a store, the system comprising:
one or more processors configured to:
receive a plurality of captured images of a shopper in a current shopping session in the store;
process the plurality of captured images to determine one or more products selected by the shopper during the current shopping session; and
determine an identity of at least one target product, selected by a product prediction model, that is estimated to have a threshold minimum likelihood of being purchased by the shopper during a remainder of the current shopping session, the product prediction model being configured to:
receive as input the one or more products selected by the shopper during the current shopping session; and
output the identity of the at least one target product; and
configured to output a message related to the target product for display on a target electronic device proximate the shopper and the target product, to cause the target electronic device to display the message to the shopper, wherein
the system includes a plurality of electronic devices positioned adjacent respective products in the store, the plurality of electronic devices being connected to a remote computing device;
the target electronic device is a selected one of the plurality of electronic devices;
the one or more processors includes respective electronic device processors in each of the plurality of electronic devices and a remote computing device processor in the remote computing device;
receiving a plurality of captured images is performed by processors of the plurality of electronic devices or by the processor of the remote computing device;
processing the plurality of captured images is performed by processors of the plurality of electronic devices or by the processor of the remote computing device;

determining an identity of at least one target product is performed by the processor of the target electronic device or by the processor of the remote computing device; and outputting a message related to the target product for display is performed by the processor of the target electronic device or by the processor of the remote computing device.

2. The computerized product promotion system of claim 1, wherein the product prediction model is trained during a training phase based on a training data set that includes for each of multiple shopping trips, a set of products purchased by a set of shoppers.

3. The computerized product promotion system of claim 2, wherein the training data set is a time-ordered list of products purchased by a shopper.

4. The computerized product promotion system of claim 2, wherein the set of shoppers includes:
a single shopper;
a demographic cohort of shoppers; and/or
all shoppers for which data is available.

5. The computerized product promotion system of claim 2, wherein the product prediction model further uses as input a shopping history over multiple shopping trips.

6. The computerized product promotion system of claim 1, wherein the product prediction model is trained to indicate a likelihood of a product being selected next in a shopping trip, given a prior selection history.

7. The computerized product promotion system of claim 1, wherein the one or more processors are configured to process the plurality of captured images to determine one or more products selected by the shopper during the current shopping session by, being further configured to:
perform a first image processing to extract shopper features from the image of the shopper;
from the extracted shopper features, recognize the shopper as distinct from other shoppers in the store by a probability threshold;
perform a second image processing to extract product features from the image of the product;
from the extracted product features, recognize the product as distinct from other products in the store by a probability threshold;
perform a third image processing to determine a product relationship between the extracted product features and the extracted shopper features, to determine that the shopper selected the product; and
associate the selections of the recognized products with the recognized shopper on the current shopping trip.

8. The computerized product promotion system of claim 1, wherein an image of the shopper and/or a secondary factor of identification is used to recognize an identity of the shopper.

9. The computerized product promotion system of claim 1, further configured to determine an identity of the shopper by at least one of:
facial recognition of the shopper; and
a MAC address of a mobile device of the shopper.

10. A method for executing a product promotion system for use in a store, the method comprising:
receiving a plurality of captured images of a shopper in a current shopping session in the store;
processing the plurality of captured images to determine one or more products selected by the shopper during the current shopping session; and
determining an identity of at least one target product, selected by a product prediction model, that is estimated to have a threshold minimum likelihood of being purchased by the shopper during a remainder of the current shopping session, the product prediction model:
receiving as input the one or more products selected by the shopper during the current shopping session; and
outputting the identity of the at least one target product; and outputting a message related to the target product for display on a target electronic device proximate the shopper and the target product, to cause the target electronic device to display the message to the shopper, wherein
a plurality of electronic devices are positioned adjacent respective products in the store which are connected to a remote computing device;
the target electronic device is a selected one of the plurality of electronic devices:
the one or more processors includes respective electronic device processors in each of the electronic devices and a remote computing device processor in the remote computing device; and
the method further includes:
receiving a plurality of captured images by processors of the plurality of electronic devices or by the processor of the remote computing device;
processing the plurality of captured images by processors of the plurality of electronic devices or by the processor of the remote computing device;
determining an identity of at least one target product by the processor of the target electronic device or by the processor of the remote computing device; and
outputting a message related to the target product for display by the processor of the target electronic device or by the processor of the remote computing device.

11. The method of claim 10, further including training the product prediction model during a training phase based on a training data set that includes for each of multiple shopping trips, a set of products purchased by a set of shoppers.

12. The method of claim 11, wherein the training data set is a time-ordered list of products purchased by a shopper.

13. The method of claim 11, wherein the set of shoppers includes:
a single shopper;
a demographic cohort of shoppers; and/or
all shoppers for which data is available.

14. The method of claim 11, further including using as input into the product prediction model a shopping history over multiple shopping trips.

15. The method of claim 10, further including training the product prediction model with product embeddings that indicate a likelihood of a product being selected next in a shopping trip, given a prior selection history.

16. The method of claim 10, wherein processing the plurality of captured images to determine one or more products selected by the shopper during the current shopping session includes:
performing a first image processing to extract shopper features from the image of the shopper; and
from the extracted shopper features, recognizing the shopper as distinct from other shoppers in the store by a probability threshold;
performing a second image processing to extract product features from the image of the product; and
from the extracted product features, recognizing the product as distinct from other products in the store by a probability threshold;

performing a third image processing to determine a product relationship between the extracted product features and the extracted shopper features, to determine that the shopper selected the product; and associating the selections of the recognized products with the recognized shopper on the current shopping trip.

17. The method of claim 10, further including using an image of the shopper and/or a secondary factor of identification to recognize an identity of the shopper.

18. The method of claim 10, further including determining an identity of the shopper by at least one of:

facial recognition of the shopper; and
a MAC address of a mobile device of the shopper.

* * * * *